UNITED STATES PATENT OFFICE 2,053,511

GASOLINE AND METHOD OF MAKING THE SAME

Harry T. Bennett and Le Roy G. Story, Tulsa, Okla., assignors, by mesne assignments, to Gasoline Antioxidant Company, Wilmington, Del., a corporation of Delaware No Drawing. Application January 16, 1928, Serial No. 247,256. Renewed May 28, 1930

19 Claims. (Cl. 44—9)

This invention relates to gasoline and more specifically to cracked gasoline.

An important object of the invention is to produce a cracked gasoline which will not deposit a residue of gum when vaporized. This is accomplished by treating fresh cracked gasoline so that it will neither deposit appreciable amounts of gum when immediately evaporated nor accumulate said gum in solution when standing in storage for long periods before consumption.

Another object is to produce a cracked gasoline which is stable in color, and this is accomplished by preventing the formation of soluble colored compounds in the gasoline on standing.

A further object is to preserve the anti-knock quality of the cracked gasoline or, in other words, to prevent the formation of soluble detonating compounds, said compounds being closely related to the gum constituents.

With the foregoing objects in view, we will proceed to point out some of the undesirable characteristics of cracked gasoline, how our invention overcomes these undesirable characteristics, and finally compare our methods with those previously used and point out the advantages of the methods we have discovered.

Cracked gasolines have the property, even when freshly made, of depositing dark brown gummy residues on surfaces from which they are slowly evaporated. The composition of the deposit is not fully understood, but has become known in the trade as gum and will hereafter be referred to by this term. The chemical reaction producing the gum is also not fully understood, but we believe it is an oxidation reaction either internal or external; internal oxidation being that taking place within the material itself, and external that caused by some external power as oxygen from the air or the rays of light.

Another property commonly noted in gasolines made from cracked products is formation of gum in solution which is evidenced by an increase in the deposit left by evaporating a sample that has stood for sometime in comparison with that formed by the original material before aging. The compounds which have the power then of producing gum when the fresh sample is evaporated apparently proceed to form gum in solution when the same product is allowed to stand.

A further property also related to gum is the detonation characteristic. It is related in that a gasoline which has accumulated appreciable quantities of gum in solution also shows a greater tendency to knock. It is important to prevent the formation of compounds which promote detonation in cracked fuels, because it is by virtue of the cracked or unsaturated nature of these fuels that they have become recognized as antiknock gasolines.

Our invention overcomes the above mentioned gum and detonation problems by inhibiting the reactions which produce gum either when the fresh sample is evaporated or when the same product is allowed to age before evaporation; and, as previously pointed out, there being a close relationship between these properties, by preventing or inhibiting the reactions which produce gum, we also suppress the formation of compounds causing detonation.

The invention which we will hereafter describe is concerned with the prevention of the reactions which cause formation of gum rather than the remedy after the harm or effect has been caused, for we have found that once the gum has accumulated in solution, it is very difficult to remove without drastic treatment. But, on the other hand, by simple treatment of the fresh gasoline by our method before the harm has resulted, it is very easy to inhibit the formation of gum when the sample is evaporated or when it is allowed to stand.

In order to overcome these undesirable properties of cracked gasoline, we add to the gasoline a small quantity of certain organic compounds which we have discovered have the property of inhibiting the formation of the undesirable gum. The nature of the inhibiting reaction, whereby these organic compounds function to prevent the formation of gum, is not clearly understood, but we characterize the compounds as inhibitors, antioxidants, negative catalysts, or simply anti-gum formers. Within the group of anti-gum formers we have found the following to be useful.

Ortho-aminophenol, meta-aminophenol, para-aminophenol, para-benzylaminophenol, beta-hydroxyethylaminophenol, para-dimethylaminophenol, 5-benzylamino-2-cresol, 2-amino-5-hydroxytoluene, 5-amino-2-hydroxytoluene, para, meta, or orthophenylenediamine, benzidine and alpha naphthylamine. In order to classify these compounds and not limit ourselves to those specified above, we prefer to distinguish them as aromatic amines and aminophenols and the derivatives of either class.

The quantity of anti-gum former required to accomplish our purpose varies somewhat, depending on the nature of the gasoline to be treated.

We may use from two to fifty milligrams per 100 cubic centimeters of the gasoline but we prefer to use approximately ten milligrams per 100 cubic centimeters. This may be added to the gasoline directly or it may be previously dissolved in a solvent such as acetone, benzol or ether, etc., and then added, in solution, to the gasoline. The latter method has been found to be advantageous where the material is difficultly dissolved.

In actual practice we prefer to treat a raw cracked gasoline direct from the still with approximately ten milligrams of ortho-aminophenol per 100 cubic centimeters. By this treatment we have found that the treated gasoline will deposit no appreciable gum when immediately evaporated or after aging for long periods.

We wish to point out that our process is equally applicable to any gum-forming cracked gasoline, whether previously treated or not, as well as the raw cracked gasoline mentioned in our preferred form. In fact our process is valuable for treating fuels which have been acid treated or filtered through fuller's earth provided they tend to form gum on storage, and also for blended fuels such as those containing products not strictly from petroleum among which may be mentioned those derived from coal tar or shale oil.

Prior to our invention the methods used consisted in treating the cracked gasoline with polymerizing agents such as sulphuric acid, fuller's earth, etc., whereby the gum forming constituents were polymerized and removed as sludge. Such methods are costly because they require special equipment, large quantities of treating reagents and considerable time for the operations. Also the prior methods removed products which are valuable as fuel, especially for anti-knock purposes. Our process on the other hand is simple in that any tank or similar equipment available in the ordinary refinery may be used for adding the anti-gum former and the time required is of no important consideration; it is inexpensive, in that the quantity of treating material is very small since it enters into the reaction more in the nature of a catalyst than in quantitative proportions, and lastly no valuable constituents of the gasoline are lost as sludge.

We claim:

1. A substantially volatile motor fuel comprising cracked hydrocarbon distillates normally tending to deteriorate and develop gummy substances on storage and containing an aminophenol in which an amino hydrogen has been substituted by a hydrocarbon radical, in quantity sufficient to retard said gum formation.

2. The method of refining a motor fuel containing unsaturated cracked hydrocarbons which tend to form gum on storage, which comprises adding to said motor fuel prior to the formation of gum an aminophenol in which an amino hydrogen has been substituted by a hydrocarbon radical, in quantity sufficient to retard such gum formation.

3. The method of preserving a motor fuel containing unsaturated cracked hydrocarbons which normally tend to form gum on storage, which comprises adding to said motor fuel prior to the formation of gum a para-aminophenol in which an amino hydrogen has been substituted by a hydrocarbon radical, in quantity sufficient to retard said gum formation.

4. A motor fuel comprising cracked gasoline which normally tends to develop gums upon storage, to which has been added para-aminophenol in which an amino hydrogen has been substituted by a hydrocarbon radical, in quantity sufficient to retard the formation of gum in said motor fuel.

5. A cracked gasoline, normally tending to deteriorate and develop gummy substances on storage and containing an aminophenol in which an amino hydrogen has been substituted by an alkyl radical, in quantity sufficient to retard said gum formation.

6. The method of preserving a motor fuel containing unsaturated cracked hydrocarbons which normally tend to form gum on storage, which comprises adding to said motor fuel prior to the formation of gum an aminophenol in which an amino hydrogen has been substituted by a hydrocarbon alkyl radical, in quantity sufficient to retard such gum formation.

7. A motor fuel comprising cracked gasoline which normally tends to deteriorate and develop gums on storage to which has been added a para-aminophenol in which an amino hydrogen has been substituted by an alkyl radical, in quantity sufficient to retard said deterioration and gum formation.

8. The method of preserving a motor fuel containing unsaturated cracked hydrocarbons which normally tend to form gum on storage, which comprises adding to said motor fuel an aminophenol in which both hydrogen atoms of an amino group have been substituted by alkyl radicals, in quantity sufficient to retard said gum formation.

9. A motor fuel comprising cracked gasoline which normally tends to develop gums upon storage, to which has been added para-aminophenol in which both amino hydrogens have been substituted by alkyl radicals, in quantity sufficient to retard said gum formation.

10. The method of preserving a motor fuel containing unsaturated cracked hydrocarbons which normally tend to form gum on storage, which comprises adding to said motor fuels a small proportion of para-dimethyl aminophenol, in quantity sufficient to retard said gum formation.

11. A motor fuel comprising cracked gasoline which normally tends to deteriorate and develop gums upon storage, to which has been added an aminophenol in which an amino hydrogen has been substituted by an aralkyl radical, in quantity sufficient to retard said gum formation.

12. The method of preserving a motor fuel containing unsaturated petroleum hydrocarbons which normally tend to form gum on storage, which comprises adding to said motor fuel prior to the formation of gum, an aminophenol in which an amino hydrogen has been substituted by an aralkyl hydrocarbon radical, in quantity sufficient to retard said gum formation.

13. A motor fuel comprising cracked gasoline which normally tends to deteriorate and develop gums upon storage, to which has been added prior to the formation of gum, an aminophenol in which an amino hydrogen has been substituted by a benzyl radical, in quantity sufficient to retard said gum formation.

14. A motor fuel comprising unsaturated cracked gasoline which normally tends to form gum and deteriorate in anti-knock value on storage, to which has been added a para-aminophenol in which an amino hydrogen has been substituted by a benzyl radical, in quantity sufficient to retard gum formation therein.

15. A motor fuel comprising cracked gasoline which normally tends to deteriorate and develop gums upon storage, to which has been added para-benzyl aminophenol, in quantity sufficient to retard said gum formation.

16. The method of treating a liquid motor fuel comprising unsaturated hydrocarbons which normally tend to form gum on storage, which comprises incorporating in said motor fuel prior to the formation of gum para-benzyl aminophenol in quantity sufficient to retard gum formation therein.

17. A motor fuel comprising cracked hydrocarbon distillates which normally tend to deteriorate and develop gummy substances upon storage and an aminocresol in which an amino hydrogen has been substituted by a hydrocarbon radical, in quantity sufficient to retard said gum formation.

18. The method of preserving a motor fuel containing unsaturated cracked hydrocarbons which normally tend to form gum on storage, which comprises adding to said motor fuel prior to the formation of gum a benzylamino cresol, in quantity sufficient to retard said gum formation.

19. A motor fuel comprising cracked gasoline which normally tends to deteriorate and develop gums upon storage, to which has been added 5-benzylamino-2-cresol, in quantity sufficient to retard said gum formation.

HARRY T. BENNETT.
LE ROY G. STORY.